(12) United States Patent
Bhagavath et al.

(10) Patent No.: US 6,505,169 B1
(45) Date of Patent: Jan. 7, 2003

(54) METHOD FOR ADAPTIVE AD INSERTION IN STREAMING MULTIMEDIA CONTENT

(75) Inventors: Vijay K Bhagavath, Lincroft, NJ (US); Joseph Thomas O'Neil, Staten Island, NY (US)

(73) Assignee: AT&T Corp., New York, NY (US)

( * ) Notice: Subject to any disclaimer, the term of this patent is extended or adjusted under 35 U.S.C. 154(b) by 0 days.

(21) Appl. No.: 09/490,807

(22) Filed: Jan. 26, 2000

(51) Int. Cl.$^7$ ................................................ G06F 17/60
(52) U.S. Cl. ........................................ 705/14; 709/219
(58) Field of Search ..................... 705/1, 14; 709/219, 709/227

(56) References Cited

U.S. PATENT DOCUMENTS

| | | | |
|---|---|---|---|
| 5,917,830 A | * 6/1999 | Chen et al. ................. | 370/487 |
| 5,937,392 A | * 8/1999 | Alberts ........................ | 705/14 |
| 5,948,061 A | * 9/1999 | Merriman et al. .......... | 709/219 |
| 6,009,410 A | 12/1999 | LeMole et al. | |
| 6,119,163 A | * 9/2000 | Monteiro et al. ........... | 709/227 |
| 6,169,542 B1 | * 1/2001 | Hooks et al. ............... | 345/327 |
| 6,188,398 B1 | * 2/2001 | Collins-Rector et al. .... | 345/327 |
| 6,338,044 B1 | * 1/2002 | Cook et al. .................. | 705/14 |

FOREIGN PATENT DOCUMENTS

WO     WO-00/59220    * 10/2000

OTHER PUBLICATIONS

"iBEAM, Engage and ZDTV partner to deliver highly targeted streaming advertising within broadband Internet programming", Dec. 21, 1999. PR Newswire, p2796.*

* cited by examiner

Primary Examiner—Jeffrey D. Carlson
(74) Attorney, Agent, or Firm—Wendy W. Koba

(57) ABSTRACT

In a multimedia presentation transmitted by streaming media, advertising/announcements are dynamically inserted into the stream in response to a realization of conditions preselected by the source of the advertising/announcements. In a particular embodiment providers of the streaming media content define metadata for the programming. Advertising/announcement sources define metadata for their ads to be presented. The requirements of both metadata files are compared to both program data and ad data to specify conditions that determine when an Advertisement/announcement is inserted into a media stream.

7 Claims, 10 Drawing Sheets

```
<AD>
   <TYPE>STREAMING</TYPE>
   <URL>PNM://WWW.DISNEY.COM/AD34.RV</URL>
   <DURATION>30</DURATION>
   <KEYWORDS>VACATION,FLORIDA,DISNEY WORLD</KEYWORDS>
   <ADVERTISER>DISNEY</ADVERTISER>
   </DEMOGRAPHICS>
      <LOW_AGE>5</LOW_AGE>
      <HIGH_AGE>10</HIGH_AGE>
      <LOW_INCOME>100000</LOW_INCOME>
      <LOCATION>NEW YORK,NEW JERSEY</LOCATION>
   <DEMOGRAPHICS>
   <DATE_TIME>
      <START_DATE>11/25/99</START_DATE>
      <END_DATE>12/25/99</END_DATE>
      <START_TIME>0700</START_TIME>
      <END_TIME>1900</END_TIME>
   </DATE_TIME>
   <CONTENT_CONSTRAINTS>
      <CHANNELS>33,45,62</CHANNELS>
   </CONTENT_CONSTRAINTS>
```

*FIG. 9A*

```
<WTP_CURRENT_RECIPIENTS>
    <POINT>0,$0</POINT>
    <POINT>999999,$0</POINT>
    <POINT>1000000,$50</POINT>
    <POINT>2000000,$50</POINT>
    <POINT>4000000,$150</POINT>
    <POINT>5000000,$150</POINT>
</WTP_CURRENT_RECIPIENTS>
<WTP_CUMULATIVE_RECIPIENTS>
    <INTERVAL>60 MINUTES</INTERVAL>
    <POINT>0,$0</POINT>
    <POINT>999999,$0</POINT>
    <POINT>1000000,$50</POINT>
    <POINT>1999999,$50</POINT>
    <POINT>2000000,$100</POINT>
    <POINT>2999999,$100</POINT>
    <POINT>3000000,$150</POINT>
    <POINT>3999999,$150</POINT>
</WTP_CURRENT_RECIPIENTS>
</AD>
```

*FIG. 9B*

```
<CONTENT>
   <TYPE>STREAMING</TYPE>
   <URL>PNM://WWW.DISNEY.COM/LIONKING.RV</URL>
   <KEYWORDS>CHILDREN,ENTERTAINMENT,CARTOON</KEYWORDS>
   <PRODUCER>DISNEY</PRODUCER>
<AD_SLOT>
   <TIME>2400</TIME>
   <DURATION>30</DURATION>
</AD_SLOT>
<AD_SLOT>
   <TIME>4800</TIME>
   <DURATION>30</DURATION>
</AD_SLOT>
<AD_SLOT>
   <TIME>7200</TIME>
   <DURATION>30</DURATION>
</AD_SLOT>
</CONTENT>
```

*FIG. 10*

METHOD FOR ADAPTIVE AD INSERTION IN STREAMING MULTIMEDIA CONTENT

FIELD OF THE INVENTION

This invention relates to the insertion of announcement/advertising and related content into streaming multimedia content. It is particularly concerned with the dynamic insertion of such material into a media stream based on dynamic comparison of audience size and composition and predetermined stipulations of the suppliers of announcements/advertising.

BACKGROUND OF THE INVENTION

Streaming is a process in which packets, sent over an IP network, are used to present material continuously to a recipient as it arrives in substantially real time as perceived by the recipient. As such the recipient does not have to download and store a large file before displaying the material.

Media streaming is a process used to deliver continuous action content media or substantially real time video and audio data to a receiving device such as a PC/video receiver with a continuous steady stream of packets. The receiving device plays back the streaming packets as they are received.

In active presentation techniques a buffering step is required; packets of the buffered content are played back while a subsequent packet is being buffered. In the perception of the viewer the play back is simultaneously presented as a continuous stream.

With the development of IP multicast and unicast protocols and improvements in the IP network and PCs, media streaming can approximate the quality of broadcast media transmission. IP media streaming gives an Internet provider an opportunity to provide many new services to both individual consumers and commercial businesses. One such opportunity is the ability to provide entertainment, news and sports targeted to a particular audience profile. In particular broadcasting of both live events and subsequent replays of these live events is now possible. Material customarily transmitted by traditional radio airwaves broadcasting may now be broadcast over the Internet.

Multicasting and unicasting are both controlled by existing standards and are well known in the art. The more recent multicasting is subject to IGMP (Internet Group Management Protocol) standards.

Traditional broadcasting over the airwaves is largely supported by advertising or by viewer/listener subscription. For mass market entertainment/sports event support by advertising is the norm. The typical viewer/listener is accustomed to this method of financial support for programming.

It would be desirable to use similar methods to support broadcasting by IP streaming. Streaming is new, however, and does not have the predictability of established broadcasting methods. Potential advertisers want to know the effect of and audience size for its advertising. It is desirable to dynamically provide such information to advertisers so that they are induced to support IP streaming broadcasts. It is also desirable to allow advertisers to tailor ad programs to actual audience demographics of streaming broadcasts.

SUMMARY OF THE INVENTION

In a multimedia presentation transmitted by streaming media, advertising/announcements are dynamically inserted into the stream in response to a realization of conditions preselected by the presenter of the streaming media content and by the source of the advertising/announcements. In a particular embodiment providers of the streaming media content define metadata describing the programming stream structure. Advertising/announcement sources define metadata describing categories of desired recipients of their ads. The requirements of both metadata files are compared with respect to both content data and ad data to specify conditions to determine which advertisement/announcement is inserted into a media stream and when that insertion occurs.

In an embodiment described herein a Measurements Server in the IP network provides the content/programming data to provide the information for dynamic control of ad insertion by the POPs of the network. The advertiser provides metadata-defining requirements for inserting advertising/announcements. Upon comparative agreement/concurrence of the programming and ad metadata requirements the specified ad is inserted into the stream in harmony with the available resources of the programming.

A first method of ad presentation inserts the ad as streaming content in interrupt positions made available by the program content provider. A second method presents the ads as banners, scrolling text of product icons without interrupting the steaming program content. Streaming type content ads must be carefully coordinated with the program structure of the streaming program content for insertion at appropriate times. Banner ads may be added concurrently with content and hence be more freely inserted at any time.

Metadata files, that characterize programming content and profile the recipients of the programming, basically control ad insertion into the streaming media. In one example the metadata files are expressed in XML (eXtensible Markup Language) a data description language. This language is used to define tags allowing specification of metadata for ads and content. XML, for example, is discussed at http://www.xml.org.

DESCRIPTION OF THE DRAWING

FIGS. 9A and 9B illustrate an illustrative ad metadata file;

FIG. 10 illustrates an illustrative content metadata file.

DETAILED DESCRIPTION

Two basic system architectures for the distribution of streaming multimedia programming and adaptive announcement/advertising are disclosed for the purpose of illustrating the invention. A first illustrative example considers ad insertion in streaming content transmitted by a content provider through IP unicast. A second illustrative embodiment discusses ad insertion in streaming content transmitted through IP multicast. Architecture of the first embodiment is shown in the FIG. 1.

Figure 1:
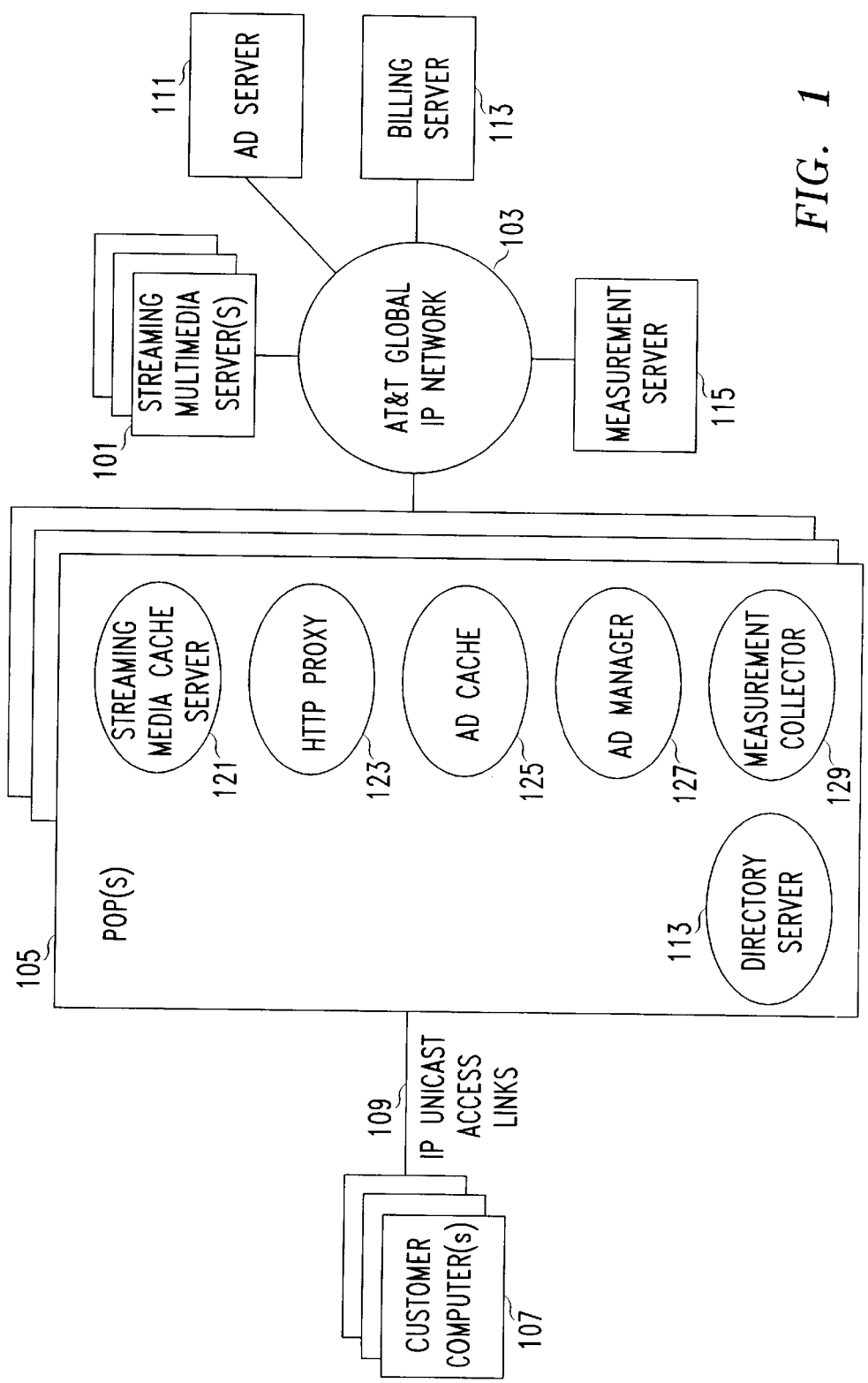
FIG. 1 is a schematic block diagram of system architecture for delivering streaming IP unicast content to a PC recipient.

The illustrative IP unicast system of FIG. 1 is built around a Global IP Network 103 which transmits program content supplied by a Streaming Multimedia Server 101 to selected POPs (Point Of Presence) 105 (i.e., termination points) of the IP network 103. IP networks such as Network 103 may use cable, fiber, and wired or wireless transmission media. Such varied use of media singly or in combination is known in the art and not discussed herein.

The selected POPs 105 are selected in response to customer requests for the program through Customer Computers 107. POPs are a network presence close to a recipient and in the instance of IP networks normally contain edge devices which represent the terminus of the network. These devices take the form of servers and are well known to those in the art. In the architecture disclosed in FIG. 1 the Streaming Media Server 101 transmits program content to the HTTP Proxy Server 123 through the Network 103 by using IP unicast. Proxy servers perform an address mapping function to act as an intermediary (i.e., a proxy address) between the customer and the Streaming Multimedia Server. Proxy servers are well known in the art.

In the transmission process the streaming program content, comprising packets, sent to the HTTP Proxy 123 are buffered in the Streaming Media Cache Server 121 which temporarily stores a copy of the program content package. The packets for both unicast and multicast including packet headers to direct them to requesting recipients. In the case of multicast transmission the recipient is identified in the network as a group in IGMP accord with IGMP standards.

The program content is forwarded to the Customer Computers 107 over an IP unicast Access Link 109. Program delivery, of the streaming content, may in substantially real time or the Customer Computer 107 may call it up at a later time for "replay delivery". These subsequent requests are satisfied by the cached copy supplied through HTTP Proxy 123; however, advertisements and announcements may inserted into the cached copy after being stored in the Cache Server 121, as needed for non-real-time unicast presentations. The insertion of announcements and advertising is dynamically responsive to the nature of the customer/recipient and the program content stream structure.

Measurement Collector 129 is a server that periodically collects data about the content stored in the Streaming Media Cache Server 121. In the unicast system of FIG. 1 it polls and records the number of times that each content in the Server Cache 121 has been requested by a Customer Computer since the last polling. In addition the Measurements Collector 129 determines the IP addresses of Customer Computers 107 making programming requests to the Cache Server 121.

By consulting the Directory Server 131, containing demographic information about the customers using the Customer computers 107, the Measurements Collector 129 collects information about customers making the programming requests. Measurement Collector information is processed into suitable forms, as discussed below, and forwarded to a Measurement Server 115 located outside of the POP 105 and connected to the IP network 103.

Figure 4:
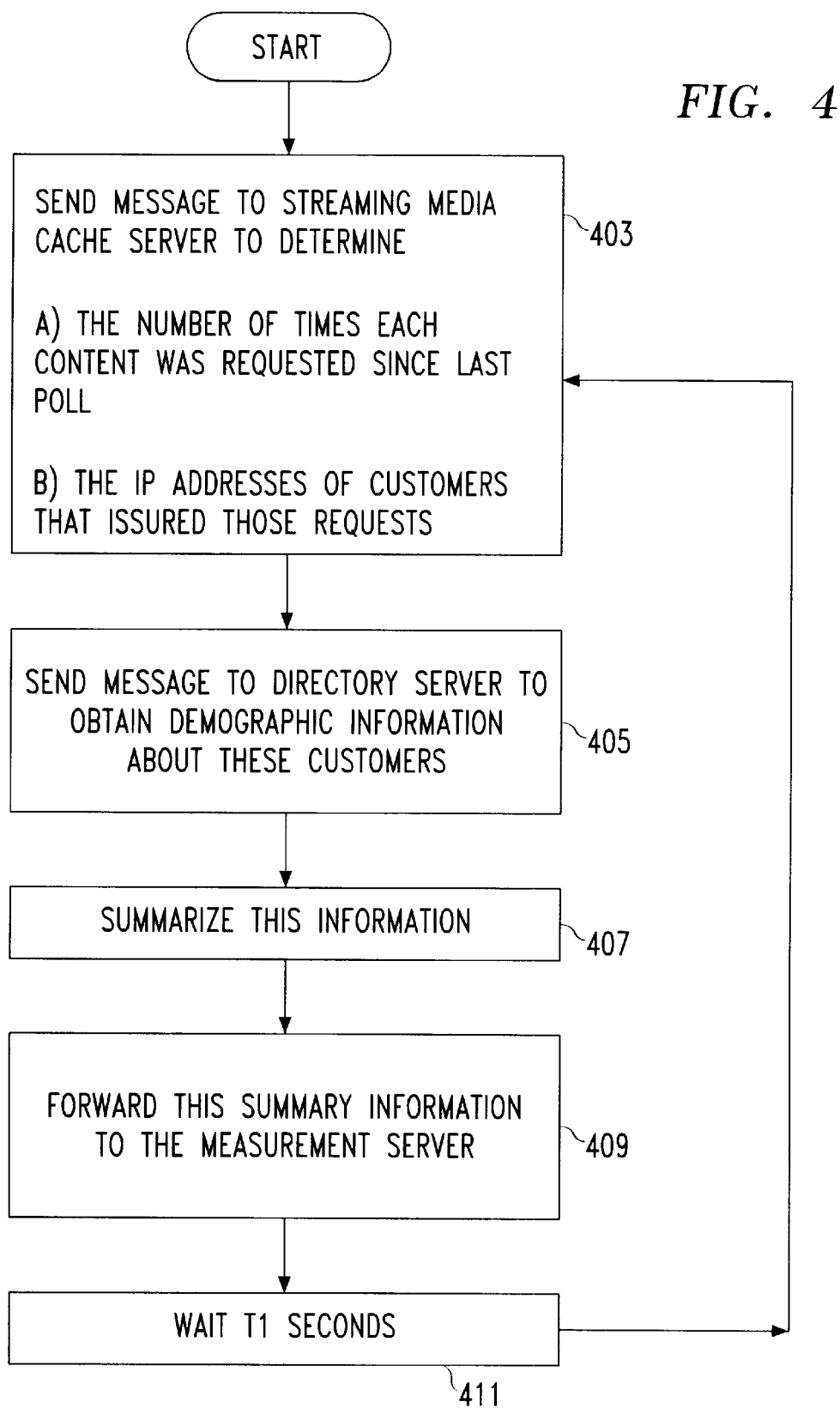
FIG. 4 is a flowchart describing operation of a Measurements Collector.

Operation of a Measurement Collector, in gathering information, is illustrated by the flow chart of FIG. 4. Initially the process, as defined by block 403, sends a message to the Streaming Media cache Server 121 to determine the number of times that a certain program content was requested and the IP addresses of the customers issuing those requests. A message is sent to the Directory Server 131, as indicated by block 405, and demographic information about those customers is retrieved. This information is summarized, as per block 407, to specify information in a format compatible with the metadata files. This summarized information is, as indicated in block 409, forwarded to the Measurement Server 115. The process, as shown in block 411, halts for a fixed interval of T1 seconds and the process flow returns to the instructions, displayed by block 403.

Measurements Server 115 is a server dedicated to aggregating data to provide a cumulative overview about program requests. It is connected to a plurality of POPs, which are receiving the streaming content, and it aggregates the information of the streaming content managed by all the Streaming Media Cache Servers located in all of these POPs 105. It provides this information upon request to the Ad Manager in the POPs.

The AD Manager 127, included in POP 105, requests the aggregate information assembled by the Measurement Server 115, which is included in the POP 105. It uses the requested aggregate information for a purpose of adaptively inserting ads into the content included in the Streaming Media Cache Server 121.

Figure 5:
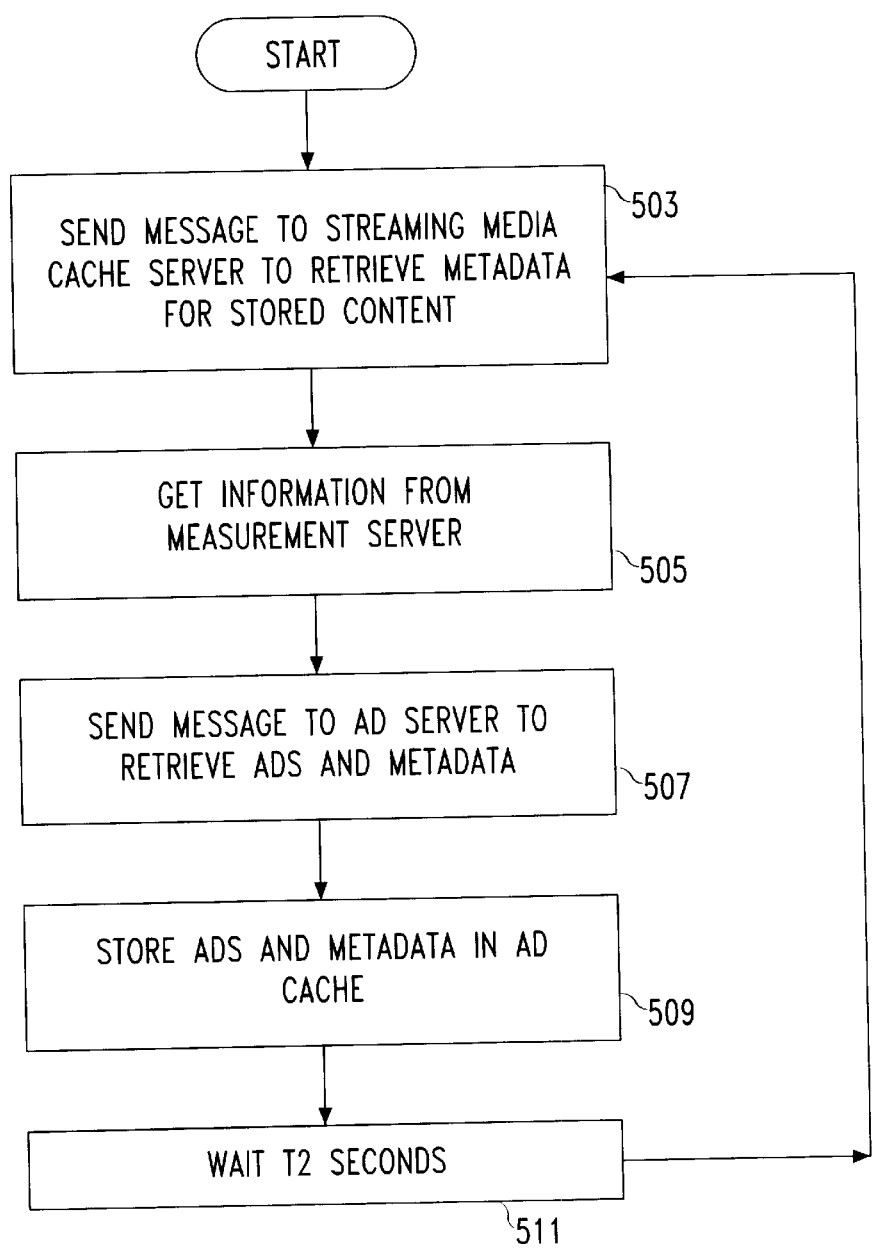
FIG. 5 is a flowchart describing operation of an Ad Manager.

In operation the Ad manager 127 performs according to the process of the flow chart illustrated in FIG. 5. Messages are sent, as shown by block 503, to the streaming Media Cache Server 121 to retrieve metadata concerning its stored program content. Information relating to customer profiles is retrieved from the Measurement Server 115 as indicated by the instruction of block 505. A message to retrieve ads and related metadata is sent to the Ad Server 111 as per block 507. The retrieved ads and metadata are stored in the Ad Cache 125 as indicated in block 509. A wait of T2 seconds is inserted, as per block 511, into the flow process before returning to the instructions of block 503.

Advertising and announcement material is requested and retrieved by the Ad Manager 127 from an Ad Server 111 located outside the POP 105 and connected to the IP Network 103. The current content retrieved from the Streaming Media Cache server 121 and the Measurement Server 115 determines the particular advertising/announcement material requested. This process is discussed below. This material is stored in the Ad Cache 125 for subsequent dynamic insertion into the Streaming Media Cache Server 121.

Streaming Media Cache Server 121 includes metadata files that are associated with cached content and which are normally supplied by the program content provider as an adjunct to the program content. Similarly the Ad Manager 127 includes information about the target customer and uses that information in metadata form in combination with the metadata file of content to determine which ads are to be presented to the Customer Computer 107.

The Streaming Media Cache Server 121 performs the ad insertion function by communicating with the Ad Manager 127 and the Ad Cache 123. The two metadata files are used to determine a best match between content stream ad acceptance/position capability and ad suitability based on the customer profile.

Figure 6:
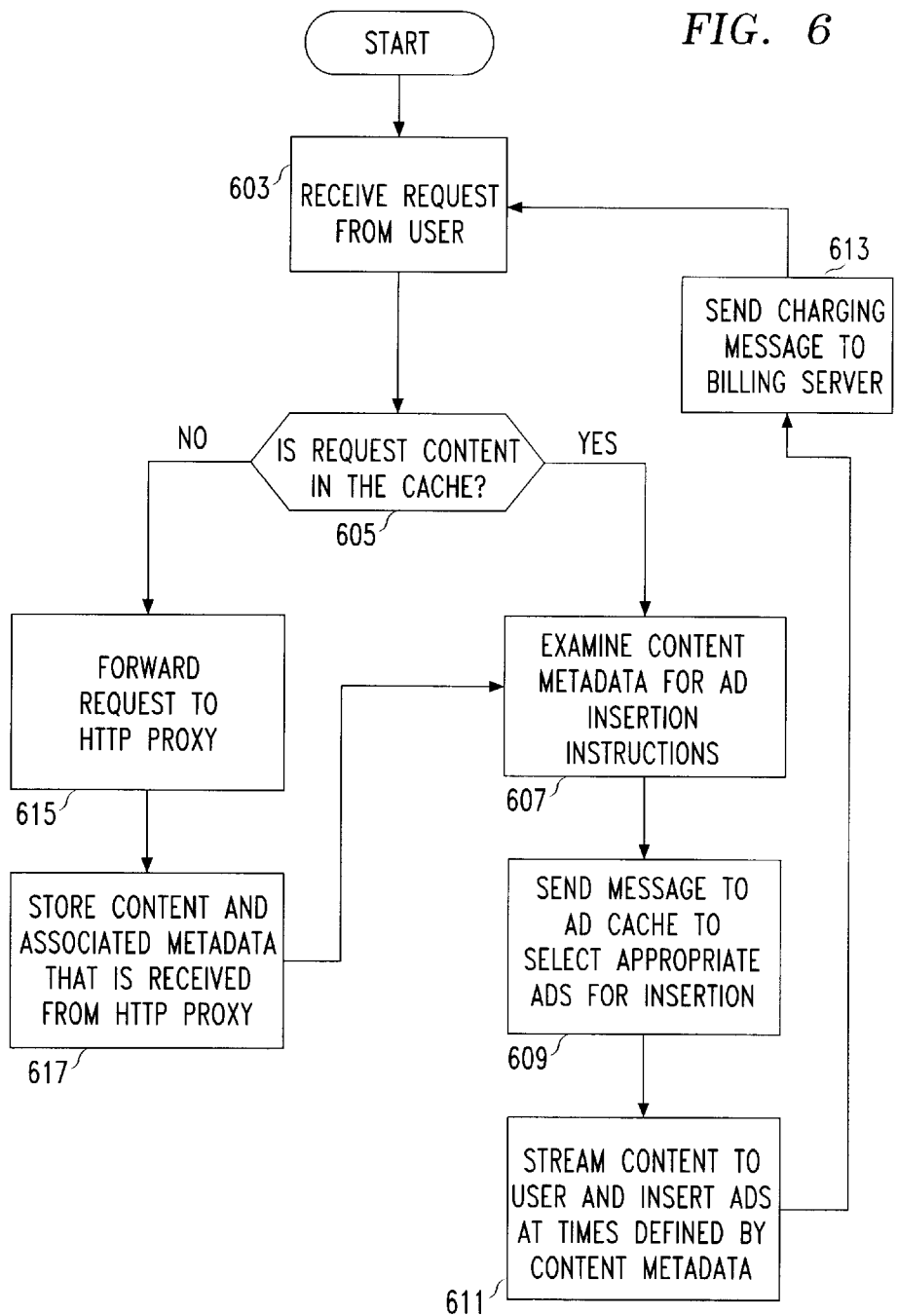
FIG. 6 is a flowchart describing operation of a Streaming Media Cache Server.

Operation of the Streaming Media cache server 121, as shown in the flow chart of FIG. 6, begins with receipt a request for a particular program stream from a user of a Customer Computer 107, as indicated in block 603. A decision process, in block 605, determines if the requested content is in the Cache 121 or not. If the requested content is already stored in the Cache 121 (i.e., a yes decision answer) the flow continues to instructions defined by block 607 which elicits an examination of content metadata for ad insertion instructions. A message is sent, as per instructions in block 609, to the Ad Cache 125 to select appropriate ads for insertion into the streaming content. The streaming content requested is transmitted, as per instructions of block 611, to the requesting user and ads are inserted at times as defined by the content metadata. Billing data is sent as a message, as per block 613, to the Billing Server 113 connected to the IP network 103. Once an ad is used the Ad Manager confirms its use to Billing Server 113. This information is used for billing the advertiser for insertion of the ads. The flow process returns to the state of receiving a user request at block 603.

There are a variety of procedures that may be used to effect a course of action respecting ad insertion by dynamically responding to agreement of conditions provided by a ad metadata file and a content metadata file. The conditions are limited only by the ability to specify them and the ability to gather data respecting them. Some conditions may seek to maximize revenue from the ads; other conditions may seek to maximize audience size. The conditions and specifications discussed here are for illustrative purposes only and are not intended to limit the scope of the invention. A wide variety of conditions are available to the ad supplier. The important thing is the flexibility afforded to the ad supplier and content provider by this method and system.

If the response of decision block 605 is a no, the request is forwarded to the HTTP Proxy 123 as indicated by block 615. The desired content is retrieved from the network with its associated metadata by the HTTP Proxy and stored in the Streaming Media Cache Server 121 and the process proceeds to block 607 with the flow as described above.

Figure 7:
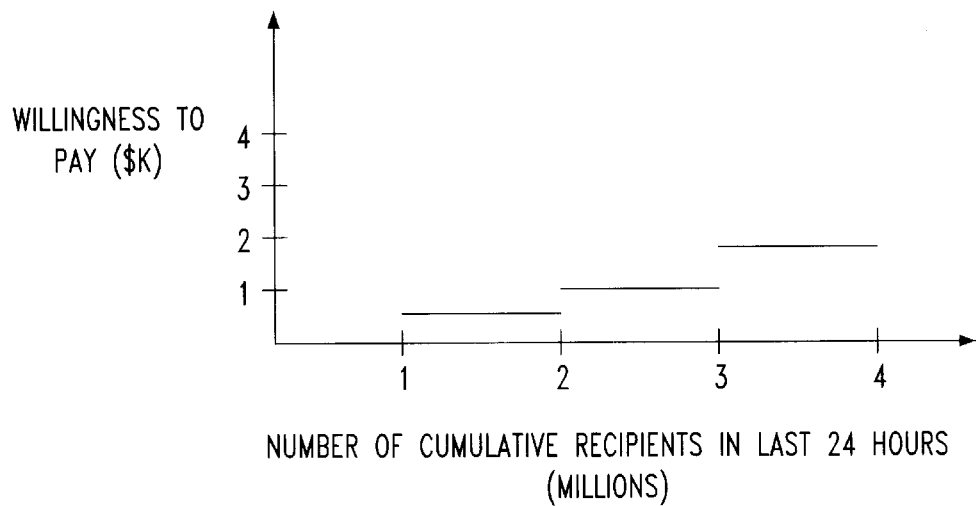
FIG. 7 is a graph of an adaptive ad pricing spec for an IP unicast program.

Structuring of one pricing scheme for IP unicast streaming content is shown in the graph of FIG. 7. A pricing scheme is described for the insertion of ads into non-real time streaming media ordered by customers at varying times. In the illustrative scheme the advertiser is interested in the cumulative number of requests for this material. The cumulative requests are deemed to be indicative of an expected viewer audience size. The cumulative size of the viewing audience is graphed and used as part of the advertiser's metadata to select content into which to insert ads. In the example the number of cumulative viewers in the last 24 hours determines a price the advertiser is willing to pay.

Figure 8:
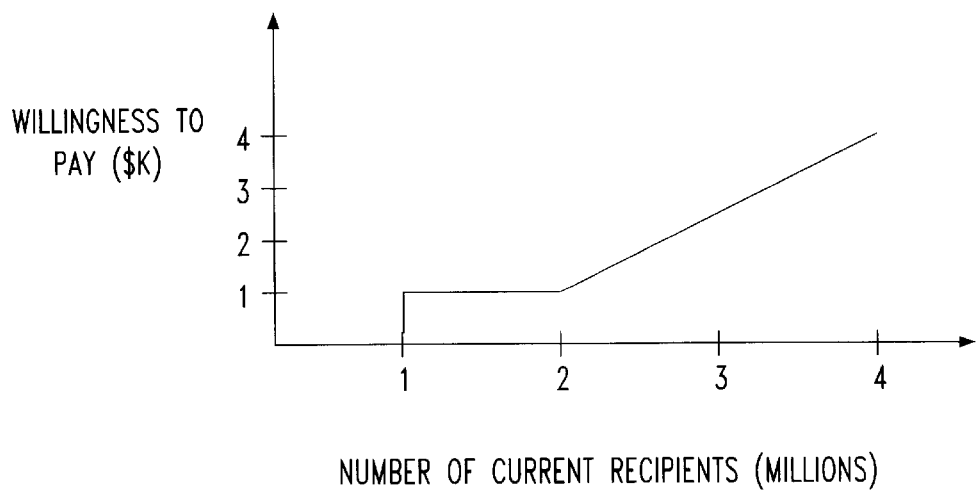
FIG. 8 is a graph of an adaptive ad pricing spec for an IP multicast program.

Multicast streaming sessions may require a different scheme of ad pricing such as shown in the FIG. 8. Multicasting reaches its customers simultaneously in real-time and hence the advertiser bases the price or willingness to advertise on the number of current recipients watching the content. Hence the graph reflects a measurement of the total number of viewers at a particular time independent of a cumulative total.

Figure 2:
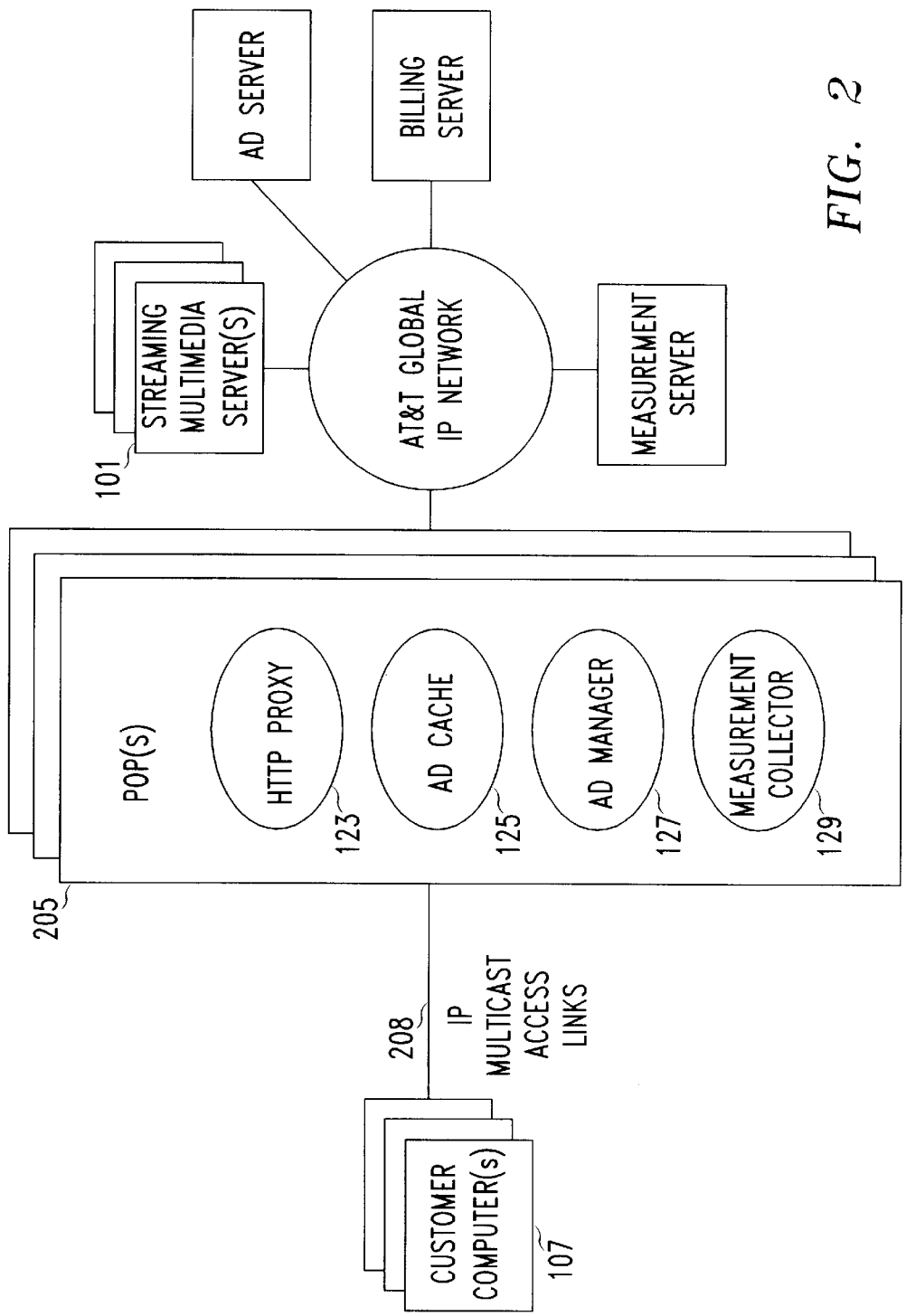
FIG. 2 is a schematic block diagram of system architecture for delivering streaming IP multicast content to a PC recipient.

Required architectures for multicasting from source to recipient are different from those needed for unicast transmission. A multicast architecture is shown in the FIG. 2. In this system a Streaming Multimedia Server 101 transmits streaming program content though an IP network 103 to the POPs 205. The streaming content received by a HTTP Proxy 123 forwards the streaming content to requesting customer computers 107 via an IP Multicast Access Link 208. Since the steaming media is transmitted in real/live time no Streaming Media Cache Server is required. Hence the HTTP Proxy 123 does the ad insertion. The Ad Cache 125, Ad Manager 127 and Measurement Collector 129 function similarly to those same components of the Unicast configuration. As indicated by the graphical illustration of FIG. 8 the ad selection for the multicast stream depends upon the current number of recipients of the program.

Figure 3:
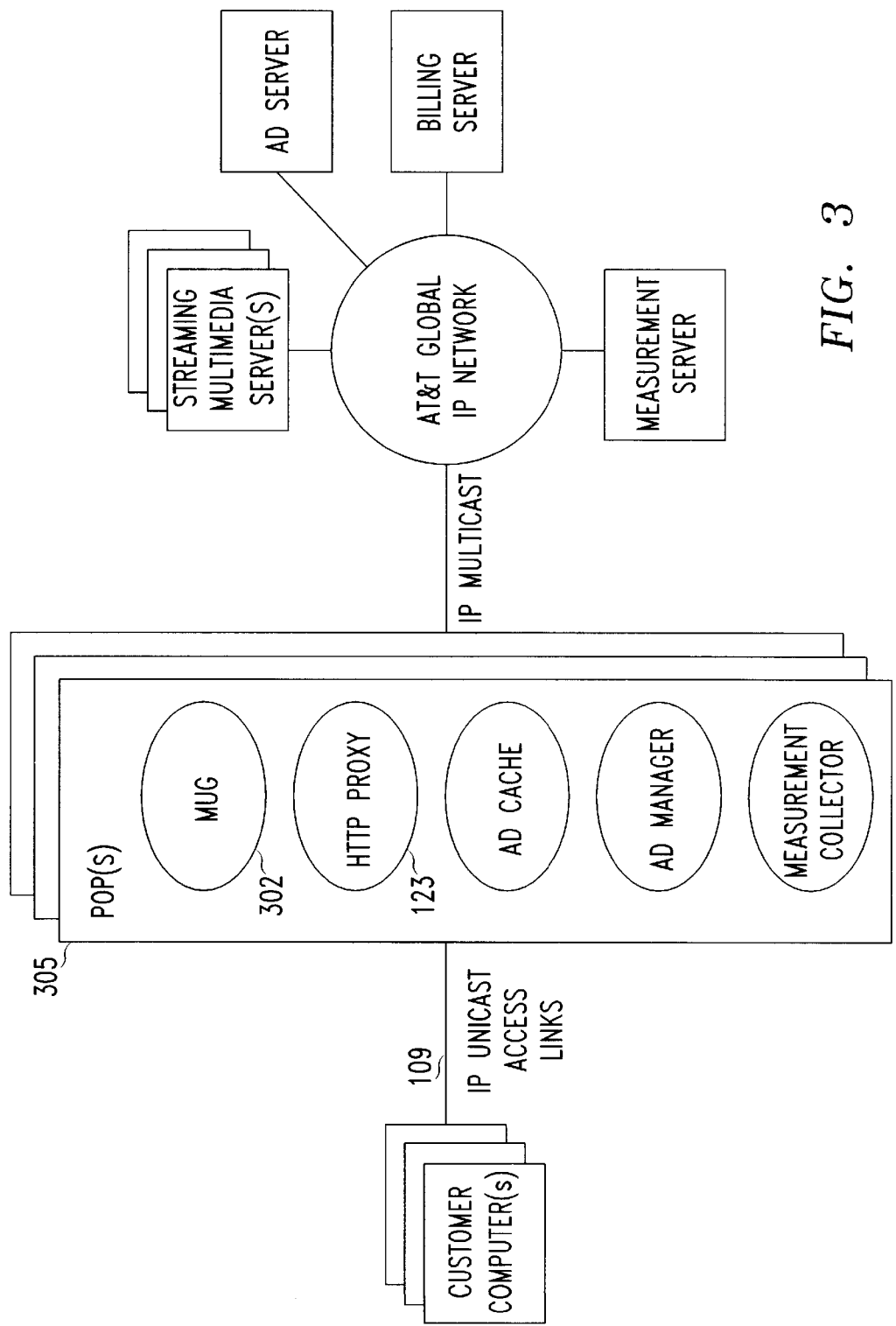
FIG. 3 is schematic block diagram of a system architecture for delivering streaming IP multicast content to a PC recipient over a IP unicast access link.

In some situations the Customer Computer 107 is connected to the POP via a unicast link. This is the architecture shown in the FIG. 3. To connect the customer Computer 107 to the HTTP Proxy 123 a Multicast-Unicast Gateway (MUG) 302 is used to connect the HTTP Proxy 123 to the unicast Access Link 109. A MUG is a gateway (i.e., an edge device at a network terminus) which connects multicast IP network to an incompatible unicast network to which Customer Computers are connected.

In each of the illustrative embodiments the ad insertion process is controlled by interaction of a content metadata file and an ad metadata file to arrive at a best fit between requirements specified by each of them. Conceptually metadata is well known to those skilled in the art. Examples of metadata files, for controlling ad insertion, are illustrated in the FIGS. 9 and 10.

An Ad Metadata file such as shown in FIGS. 9A and 9B is provided by the advertiser/announcer source of the ad. A typical Ad Metadata file includes URLs (Universal Resource Locator) for streaming media for the ad, text for the ad, and the image(s) for the ad, etc. Data is included defining a duration of the ad and the source of the ad (i.e., the advertiser). The target audience demographics are defined as well as constraints on the times and dates of display of the ad. Constraints may be included on ad content vis-a-vis the other constraints. Willingness to pay by the advertiser based on current or cumulative recipients may also be included, as shown in particular in FIG. 9B.

The Ad metadata file of FIGS. 9A and 9B is presented in XML format. The metadata, for example, includes type tags for "streaming" URL, tags for locating the stream, keywords for characterizing the ad, tags for identifying required audience demographics, tags placing time limits on presentation of the ad, and point tags representing the points on the graph of the acceptability graph for the ad to be presented.

The content provider of the streaming media provides the content metadata of FIG. 10. Metadata included covers the URL of the streaming content, the target audience demographics, and intervals (i.e. position/duration) when ads may be inserted into the media stream.

While some specific conditions for ad insertion have been discussed, these are for illustrative purposes only and have not been intended to be limiting on the scope of the invention.

What we claim is:

1. A method of maintaining and updating an advertisement/announcement cache at a local point-of-presence in an IP network for inserting appropriate advertisements/announcements in streaming media transmitted through the IP network to a recipient, the method comprising the steps of:

maintaining and updating a cache of frequently-requested media and associated content metadata for each maintained media stream;

maintaining and updating a cache of advertisements/announcements and associated ad metadata for each advertisement/announcement;

colleting measurements, on a periodic basis, of the identity of each media stream requested, the number of times each stream was requested during the period, and the identity of each recipient of each stream and storing as content metadata;

collecting demographic information for each identified recipient and storing as ad metadata; and storing and updating, in a measurement server at the point-of-presence, the collected measurements and demographic information; and comparing the ad metadata to the content metadata for determining which advertisements/announcements to insert into a stream of media.

2. The method as defined in claim 1 wherein in the step of collecting measurements includes the steps of counting the number of requests for each media stream during a predetermined time interval; and determining the IP address of each recipient of each media stream.

3. The method as defined in claim 2 wherein the method comprises the further step of querying a directory server with each determined IP address to retrieve demographic information for each recipient of each media stream.

4. The method as defined in claim 1 wherein the step of maintaining and updating the content metadata includes maintaining and updating a set of defined demographics for a target audience of each media stream.

5. The method as defined in claim 1 wherein the step of maintaining and updating the content metadata includes maintaining and updating a set of defined positions for and durations of advertisements/announcements in each media stream.

6. The method as defined in claim 1 wherein the step of maintaining and updating the ad metadata includes maintaining and updating demographics associated with a target audience for each advertisement/announcement.

7. The method as defined in claim 1 wherein the ad metadata includes information defining a willingness to pay by an ad supplier.

* * * * *